(12) United States Patent
Vetsch et al.

(10) Patent No.: US 7,983,879 B1
(45) Date of Patent: Jul. 19, 2011

(54) CODE GENERATION FOR DATA ACQUISITION AND/OR LOGGING IN A MODELING ENVIRONMENT

(75) Inventors: Michael A. Vetsch, Sassel (CH); Rajiv Ghosh-Roy, Hudson, MA (US)

(73) Assignee: The MathWorks, Inc., Natick, MA (US)

(*) Notice: Subject to any disclaimer, the term of this patent is extended or adjusted under 35 U.S.C. 154(b) by 660 days.

(21) Appl. No.: 11/893,623

(22) Filed: Aug. 15, 2007

Related U.S. Application Data

(63) Continuation-in-part of application No. 09/910,170, filed on Jul. 20, 2001, now Pat. No. 7,613,716.

(51) Int. Cl.
*G06F 7/60* (2006.01)
*G06F 17/10* (2006.01)

(52) U.S. Cl. .......................................... 703/2
(58) Field of Classification Search .............. 703/2
See application file for complete search history.

(56) References Cited

U.S. PATENT DOCUMENTS

| | | | |
|---|---|---|---|
| 4,914,568 A * | 4/1990 | Kodosky et al. | 715/763 |
| 5,042,621 A * | 8/1991 | Ovaska et al. | 187/393 |
| 5,301,336 A * | 4/1994 | Kodosky et al. | 715/846 |
| 5,325,481 A * | 6/1994 | Hunt | 715/809 |
| 5,331,111 A * | 7/1994 | O'Connell | 84/602 |
| 5,479,643 A * | 12/1995 | Bhaskar et al. | 717/124 |
| 5,579,462 A * | 11/1996 | Barber et al. | 345/440 |
| 5,612,866 A * | 3/1997 | Savanyo et al. | 700/86 |
| 5,734,863 A * | 3/1998 | Kodosky et al. | 703/27 |
| 5,815,708 A | 9/1998 | Kessler et al. | |
| 5,974,257 A * | 10/1999 | Austin | 717/125 |
| 6,085,156 A * | 7/2000 | Rust et al. | 702/91 |
| 6,088,029 A * | 7/2000 | Guiberson et al. | 715/808 |
| 6,173,438 B1 | 1/2001 | Kodosky et al. | |
| 6,219,628 B1 * | 4/2001 | Kodosky et al. | 703/2 |
| 6,330,546 B1 | 12/2001 | Gopinathan et al. | |
| 6,408,431 B1 | 6/2002 | Heughebaert et al. | |
| 6,560,557 B1 * | 5/2003 | Carnahan et al. | 702/122 |
| 6,714,883 B1 * | 3/2004 | Samuels | 702/68 |
| 6,825,838 B2 * | 11/2004 | Smith et al. | 345/419 |
| 7,178,112 B1 * | 2/2007 | Ciolfi et al. | 716/1 |
| 7,200,529 B2 * | 4/2007 | Cifra et al. | 702/189 |
| 7,392,508 B1 * | 6/2008 | Podowski | 717/125 |
| 7,650,589 B2 * | 1/2010 | Cifra | 717/105 |
| 2003/0058280 A1 * | 3/2003 | Molinari et al. | 345/771 |
| 2004/0254949 A1 * | 12/2004 | Amirthalingam | 707/101 |
| 2005/0035966 A1 * | 2/2005 | Pasquarette et al. | 345/440 |
| 2005/0035967 A1 * | 2/2005 | Joffrain et al. | 345/440 |
| 2005/0039170 A1 * | 2/2005 | Cifra et al. | 717/125 |
| 2007/0044078 A1 * | 2/2007 | Cifra | 717/135 |
| 2008/0147371 A1 * | 6/2008 | Gupton et al. | 703/14 |

* cited by examiner

*Primary Examiner* — Dwin M Craig
(74) *Attorney, Agent, or Firm* — Nelson Mullins Riley & Scarborough LLP; Kevin J. Canning; Matthew T. Fagan (57) ABSTRACT

A mechanism for configuring an inspection component in a real-time model is disclosed. The inspection component includes user-configurable parameters that control the acquisition of data for the real-time model. The data acquisition and logging logic is set up using graphical blocks that are part of the larger real-time application model. When code generation is done for the model, the data acquisition logic is also automatically generated, and runs as part of the execution of a real-time task.

53 Claims, 10 Drawing Sheets

CODE GENERATION FOR DATA ACQUISITION AND/OR LOGGING IN A MODELING ENVIRONMENT

BACKGROUND

Historically, time-based block diagram models have been used to study, design, debug, and refine dynamic systems representative of many real-world systems. A dynamic system (either natural or man-made) is a system whose response at any given time is a function of its input stimuli, its current state, and the current time. Many systems can be represented by models that are based on difference or differential equations. Often, these models are formulated as a state space representation, where the state captures how the model responds to a given input. These systems can be physical such as cell phones, automobiles, automobile subsystems (e.g., a power window system), airplanes, washers, etc., but also conceptual such as, for example, the stock market. Models based on difference equations and differential equations exhibit behaviors as state changes that are related to time as an independent variable. Another approach to modeling is the use of discrete state based models such as state transition diagrams and Petri nets which can often be represented as finite state machines. Such discrete state based models exhibit behaviors as sequences of state changes that are not necessarily related to time as an independent variable. In both cases, an implicit or explicit function may provide the next state of the model, given the current state and input. In case of differential equations, this function may include numerical integration algorithms that discretize time according to a fixed or variable time step. Likewise, an implicit or explicit function may provide the output of the model, given the current state and input. Generating the behavior of a model given its initial state and input is referred to as executing or simulating the model.

Models may be used as a basis for generating code and/or applications to be executed on a specific target platform. When the code being generated from the model is for a real-time application, data acquisition and logging may be important for monitoring the effectiveness of the application. A model that is designed in its entirety or in part for the purpose of real-time operation in some form, either directly, by means of code generation, or in another incarnation is referred to as a real-time model. Data acquisition refers to acquiring data from an application such as, for example, information about computed values of a real-time application implemented in software. Data logging refers to the storage of data (e.g., internal states of the real-time application) such as for monitoring by a human or storage for future processing and analysis. This storage operation may occur repeatedly, for example based on a time period (periodic data logging), based on an event (event based data logging), or based on a combination of the two. Time-based and event-based logging may be implemented according to one or more algorithms. For example, the algorithm(s) may be used to store data, to identify when to log data, to identify a time interval in which to log data for, to indicate whether the data logging is periodic (time-based) or event-based, etc.

SUMMARY

In one embodiment a method for controlling data acquisition and/or logging in a real-time modeling environment includes the step of accessing a real-time graphical model that includes multiple components. The multiple components include at least one inspection component. The inspection component includes parameters configurable by a user that control data acquisition during an execution of the real-time graphical model. The method also configures at least one of the parameters in the inspection component and executes the real-time graphical model that includes the inspection component. The execution of the inspection component causes an acquisition of data based on the at least one configured parameter.

In another embodiment, a method for controlling data acquisition and/or logging in a real-time modeling environment includes the step of accessing a graphical model that includes multiple components. The multiple components include at least one inspection component that includes parameters configurable by a user. The parameters control data acquisition and/or logging operations during an execution of the graphical model. The method also configures at least one of the parameters in the inspection component and generates code from the graphical model and the at least one inspection component for an intended target.

In one embodiment a system for controlling data acquisition in a real-time modeling environment includes a real-time graphical model with multiple components. The components include at least one inspection component that includes parameters configured by a user. The parameters control data acquisition during an execution of the real-time graphical model. The system also includes a code generation facility that generates code for a target from the real-time graphical model that includes the at least one inspection component. The system further includes a display device that displays the real-time graphical model to a user.

BRIEF DESCRIPTION OF THE DRAWINGS

The exemplary embodiments of the present invention are pointed out with particularity in the appended claims. The embodiments may be better understood by reference to the following description taken in conjunction with the accompanying drawings, in which:

DETAILED DESCRIPTION

Conventionally, data acquisition and logging logic has been hard-coded in the real-time kernel of the operating system used to execute an application using a modeling environment and the user is restricted to the features provided by the kernel developer. The conventional data acquisition and logging operations are triggered/initiated based on criteria contained in static code that is not ordinarily accessible to a user. For example, separate acquisition devices may be triggered by their own signals. It has also been possible for one acquisition device to trigger another, either for concurrent acquisition (device 1 triggers device 2 at the point device 1 is triggered), or for successive acquisition (device 1 triggers device 2 when device 1 is done acquiring). A combination of these two types of acquisition has also been possible using conventional modeling techniques. Likewise it has also been conventionally possible to trigger a device based on an input signal crossing a certain threshold, either rising, falling or in either direction. However, conventional techniques have not allowed a user to trigger based on a condition such as [input signal 2 crosses 2.75 rising AND device 3 is triggered]. Other criteria, such as changing acquisition length, pre-trigger interval and/or decimation, are also not possible using conventional techniques. As a result, it has traditionally been difficult for the user to choose a different triggering scheme for the data acquisition and logging operations. Because of the location of the data acquisition and logging logic in the real-time kernel, conventional code generation for a target platform that is based on a model either does not include data acquisition and logging logic or else includes default code from the kernel that cannot be changed.

The hard coding of data acquisition and logging logic (i.e., the coding of data acquisition and logging logic in a manner that may not be changed by a user) has traditionally presented problems when constructing real-time applications in graphical modeling environments, such as, for example, when constructing oscilloscopes modeled in software. The construction of real-time applications in graphical modeling environments has traditionally suffered from this inability to customize data acquisition and data logging operations because the logic has been hard coded and cannot be changed by the user. For example, in a conventional real-time application, the data acquisition operations may have been hard-coded so that the real-time model waits and acquires a single data point at a given sample rate. Users accordingly were unable to access the parameters controlling data acquisition to alter the amount or timing of the data collection. For applications such as modeled oscilloscopes, multimeters, spectrum analyzers, etc., for which designers may wish to try several different rates and amount of data acquisition, the lack of flexibility may present a problem.

Embodiments of the present invention provide user-configurable parameters that control the acquisition and logging of data for a model. The embodiments provide the user configurable parameters as part of an inspection component in a model. The inspection component is a block, set of blocks, or other model component(s) that include the user-configurable parameters. The data acquisition and logging logic is set up using graphical blocks that are part of the model. During execution of the model, the configured parameters of the inspection component control data acquisition and logging. When code generation is done for the model, the data acquisition and logging logic is automatically generated in the code based on the configured parameters in the inspection component. The generated code may run as part of the execution of a real-time task. Optionally, some non real-time tasks also analyze the acquired data and provide feedback to the end-user, thus eliminating analysis and re-iteration that would otherwise be done during post-processing of the data.

An oscilloscope is a graph displaying device that visually represents a graph of an electrical signal. The graph is often used to show how a signal changes over time with the vertical axis representing voltage and the horizontal axis representing time. The brightness of the display may be used to represent the intensity of the signal or to fade with the passage of time and is sometimes referred to as the 'z' axis. Additionally, horizontal and vertical sensitivity can be adjusted, multiple graphs/signals can be displayed, the oscilloscope may have an automatic scaling feature, and there may be markers to be positioned manually or automatically, for example for a measurement. The displayed graph may be used to analyze the signal. The signal may be displayed as either an analog signal or a digital signal. In addition to electronics, oscilloscopes equipped with transducers (that create an electrical signal in response to physical stimuli) may be used to analyze sound, pressure, heat, mechanical stress and other physical stimuli. An oscilloscope may be implemented in software as a 'virtual instrument'.

The embodiments of the present invention may allow a user to model and simulate the execution of an oscilloscope, multimeter, spectrum analyzer, inspection device such as a strip chart or gauge, or other device in software using an inspection component to provide user-configurable parameters that control the acquisition and logging of data for the model. The use of graphical programming to model data acquisition and logging characteristics provides the user with flexibility in model design in an intuitive manner.

For example, an oscilloscope or similar device modeled in software ("virtual instrument") will have a buffer length, and a decimation. When a trigger occurs, the "scope" will acquire and store N (=buffer length) samples subsequent to the trigger point (sample at which the trigger event takes place). However, the dynamics of the system might mean that it is not necessary to acquire every sample, but only every D (=decimation) samples. Thus the total acquisition time is N*D samples after the trigger point. Depending on the nature of the trigger, the user may wish to either increase N or decrease D when a critical event is occurring. Using the inspection component, the user may provide an input for acquisition length and decimation to the Buffer block. This input may be a variable in the model whose value is computed during execution.

As another example, the inspection component is also useful in modeling pre- and post-triggering features. Typically, data acquisition takes place at the trigger point. Once an event that generates the trigger has taken place in the system, the state(s) of the model are captured to find out how the system reacts. However, it may be useful to determine what caused the triggering event to happen in the first place, and thus the user designs the model to start acquiring data from *before* the trigger point by a certain number of samples (for example, by storing a number of samples that are discarded as long as the trigger does not happen within a certain time). This is known as pre-triggering. Similarly, the user may judge that there will be some transient conditions immediately following the trigger point. The user may then ask the data acquisition to start not at the trigger point, but a certain number of samples *after* this point. This is known as post-triggering. Similar to the conditions under which N and D in the previous example were modified based on the criticality of events in the model, it is also possible to modify the pre- and post-trigger intervals (subject to a maximum of the buffer size N) dynamically depending on inputs to the data acquisition/logging that comes from the rest of the model.

The simulation of the model, such as a block diagram model or UML model, may be performed in a single simulation loop, or multiple simulation loops may be modeled and executed. These simulation loops can be executed concurrently in separate threads, tasks, processes, or other forms of execution. The concurrent execution may be mimicked by two or more simulation loops using an interleaved execution to share one execution resource. Simulation loops may be controlled separately by the user, for example, to start, stop, and pause a simulation loop. Different configurations may be chosen for the separate simulation loops. For example, one simulation loop may be executed by using a variable step solver which may be based on implicit or explicit numerical integration schemes, while another simulation loop that is part of the same model may be executed by using a fixed step solver.

The graphical representation of an inspection component in the model that controls data acquisition and logging operations provides a mechanism for the design of real-time and/or other models. The exposure to a user of the parameters controlling data acquisition and logging operations in the graphical model has the additional benefit of facilitating the generation of code containing the data acquisition and logic that is intended to be deployed and executed in a real-time target environment. User changes to the inspection component parameters serve as the basis for the data acquisition and logging logic in the generated code thereby allowing more flexibility than is possible with conventional code generation techniques.

Figure 1:
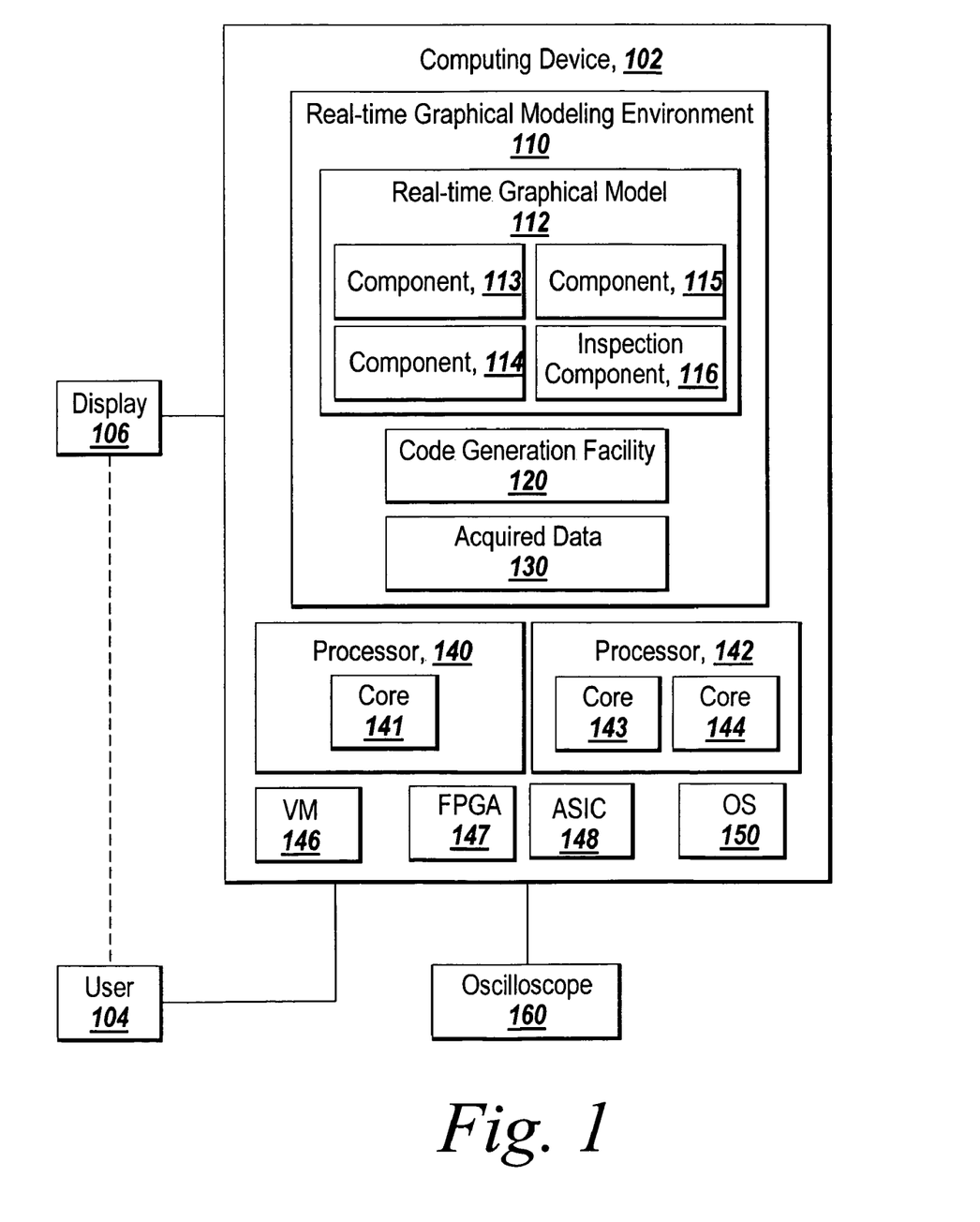
FIG. 1 depicts an exemplary environment suitable for practicing an embodiment of the present invention.

FIG. 1 depicts an environment suitable for practicing an embodiment of the present invention. A computing device 102 supports a real-time graphical modeling environment 110. The computing device 102 may be a workstation, server, laptop, mainframe, PDA or other computing device equipped with a processor or processors 140 and 142 and be able to support the real-time graphical modeling environment 110. Each of the processors may have one core 141 or multiple cores 143 and 144. The real-time graphical modeling environment 110 may be a simulation and execution environment. The real-time graphical modeling environment 110 enables the modeling of real-time systems and the generation of code designed to be executed in real-time on a target platform. An exemplary real-time graphical modeling environment 110 is the environment afforded by SIMULINK® software produced by The MathWorks, Inc. of Natick, Mass.

The computing device 102 may use hardware acceleration to execute the real-time graphical modeling environment 110 and may run code on a Field Programmable Gate Array (FPGA) 147 or an Application Specific Integrated Circuit (ASIC) (148). The computing device 102 may also execute code in one or more virtual machines 146. The computing device 102 may be in communication with one or more target platforms such as oscilloscope 160. It will be appreciated that the oscilloscope 160 or other target platforms may be part of the computing device 102 but separate from the real-time graphical modeling environment, or physically separate from, but communicating with, the computing device 102.

The real-time graphical modeling environment 110 includes at least one real-time graphical model 112. The real-time graphical model 112 may be a block diagram model that is at least partially capable of being executed in the real-time graphical modeling environment 110. The real-time graphical model 112 may include multiple components 113, 114 and 115 and at least one inspection component 116. The inspection component 116 graphically represents parameters that control data acquisition and/or logging logic for the real-time graphical model 112 and is configurable by a user 104 viewing the real-time graphical model on a display 106.

In contrast to conventional techniques that hard-code the data acquisition and data logging logic, the inspection component 116, which may be a library-provided block, exposes configurable parameters controlling data acquisition to the user 116. The data acquisition logic is encoded in the inspection component 116 and only the most basic functionality may be hard-coded, such as the First-In First-Out (FIFO) data buffer in which the data is stored. The inspection component 116 allows the performance of tasks such as:
  a) Analysis of the data, which may be for further consumption by a human;
  b) Post processing of data before storage/logging for future use; and
  c) Analysis of the data where the data is not required to be analyzed immediately as it becomes available but rather is analyzed close to the time the data becomes available subject to the availability of computing resources.

For cases (b) and (c), a use case may occur when the model has variable execution times, such as cases where frequent use is made of conditionally executed subsystems. In such cases, these tasks may be executed as background tasks that eventually catch up or else drop/disregard data (by design). The background tasks may make use of spare CPU cycles that are not otherwise being utilized by the execution of the real-time model 112. The real-time kernel's role is to provide data storage in the interim. These background tasks will be managed by the kernel but will not jeopardize operation of the real-time application. Thus, one exemplary embodiment of the present invention provides simultaneous modeling of real-time and non real-time tasks within the same graphical model. There may be multiple such background tasks, depending on the logging/scope setup that the user has specified. Each background task has priorities assigned to it and operates in conjunction with the various real-time tasks.

For example, in one embodiment, a user of a real-time graphical modeling application, such as a Simulink®/Real Time Workshop™-based application, designs a model for a control system, a data acquisition system, or, for example, to design a hardware-in-the-loop system. The designer of such a system may have specific needs as far as the background tasks are concerned. For instance, for a display task, the user may know that he only wants to see the results, and consequently an occasional dropped frame (or other form of data) is of no consequence to the user as long as the user is presented with (for example) at least a new frame once a second. To take another example, when logging data to a file for future analysis, the user may know that as long as the data eventually is logged, the user does not care about what kind of buffering or scheduling (in the OS sense) is used to accomplish the logging.

The inspection component 116 enables a user to enter high-level commands that are translated into scheduling commands for background tasks that use the appropriate OS mechanisms such as mutexes and semaphores to ensure that the user commands are carried out. For example, in the first example above (dropping frames is acceptable, as long as a frame is shown at least once per second), the actual commands to be performed may be a semaphore signaling that the scope should go about its task of displaying the data. However, if the scope task is already busy from a previous invocation, this instance will be dropped and not queued although a count of dropped invocations may be kept and monitored for the once per second criterion. If that once per second criterion is not met (i.e., one second has gone by without a successful scope display), a number of actions may be taken as dictated by the user. For example:
  a. Stop the entire application with an overload.
  b. Stop the scope task and display a notification of "time starvation".
  c. Pause the task, display notification as in (b), and then attempt to restart.

d. Temporarily increase the priority of the scope task, recognizing that this may affect another background task.

It should be noted that choice (d) is motivated by the fact that in the two use cases above, it is likely that the file logging task will run at a higher priority than the scope task. Similar considerations may be applied to file system tasks as well. It should be appreciated that other actions are also possible in addition to those listed above.

The inspection component 116 may allow a user to change acquisition sample times, specify different sample times for particular operation modes and specify custom triggering criteria. The acquisition of data may be made dependent upon the occurrence of a model event that is external to the acquisition task. The user may select triggering criteria that require that an enabling signal be received and/or that a first and/or second signal meet certain conditions prior to data acquisition beginning. For example, the signal may be required to be an increasing or decreasing signal. The inspection component 116 may allow a user to specify that the real-time model 112 be in a particular state prior to the acquisition of data. The inspection component 116 may include a parameter that is configurable by a user to specify the size of a buffer used to store data. The inspection component 116 may function as a multiplex signal selection block. Alternatively, the inspection component 116 may be a subsystem block for an oscilloscope in which the user can select parameters. Further, the inspection component 116 may allow a user to specify the performance of certain post-processing tasks to be performed on the acquired data 130 prior to the acquired data 130 being stored. The results of this post-processing may be presented to the user during the execution of the real-time model. Additionally, an embodiment of the present invention may allow a user to pause execution of a real-time model, alter a parameter in the inspection component 116 and then resume the execution of the real-time model 112. It will be appreciated that a real-time model 112 may include more than one inspection component 116 and the different inspection components can have different execution needs. One may allow a certain delay in being performed whereas the other may allow less delay but, for example, more jitter.

The real-time graphical modeling environment 110 also may include a code generation facility 120. The code generation facility 120 may be implemented in software and generates executable code for an intended external target. The code generation facility 120 examines the real-time graphical model 112 and generates code based on the components 113, 114 and 115 included in the real-time graphical model. The inclusion of the inspection component 116 in the real-time graphical model 112 results in the ability to generate executable code for the intended target directly from the real-time graphical model that includes the data acquisition and/or data logging logic from the real-time graphical model 112. The real-time graphical modeling environment 110 may also include acquired data 130 that is acquired pursuant to the data acquisition and data logging logic represented by the inspection component. The embodiments of the present invention may subject the acquired data to post-processing operations prior to saving the data. The post-processing operations may occur using available clock cycles during the execution of the real-time graphical model 112.

The operating system 150 on the computing device 102 provides support for multiple tasks. In one embodiment, models of the oscilloscopes each run in their own task. The operating system 150 may support pre-processing such as data type conversion or scaling. The operating system may also provide support for dynamically changing signals for a scope being modeled.

Figure 2:
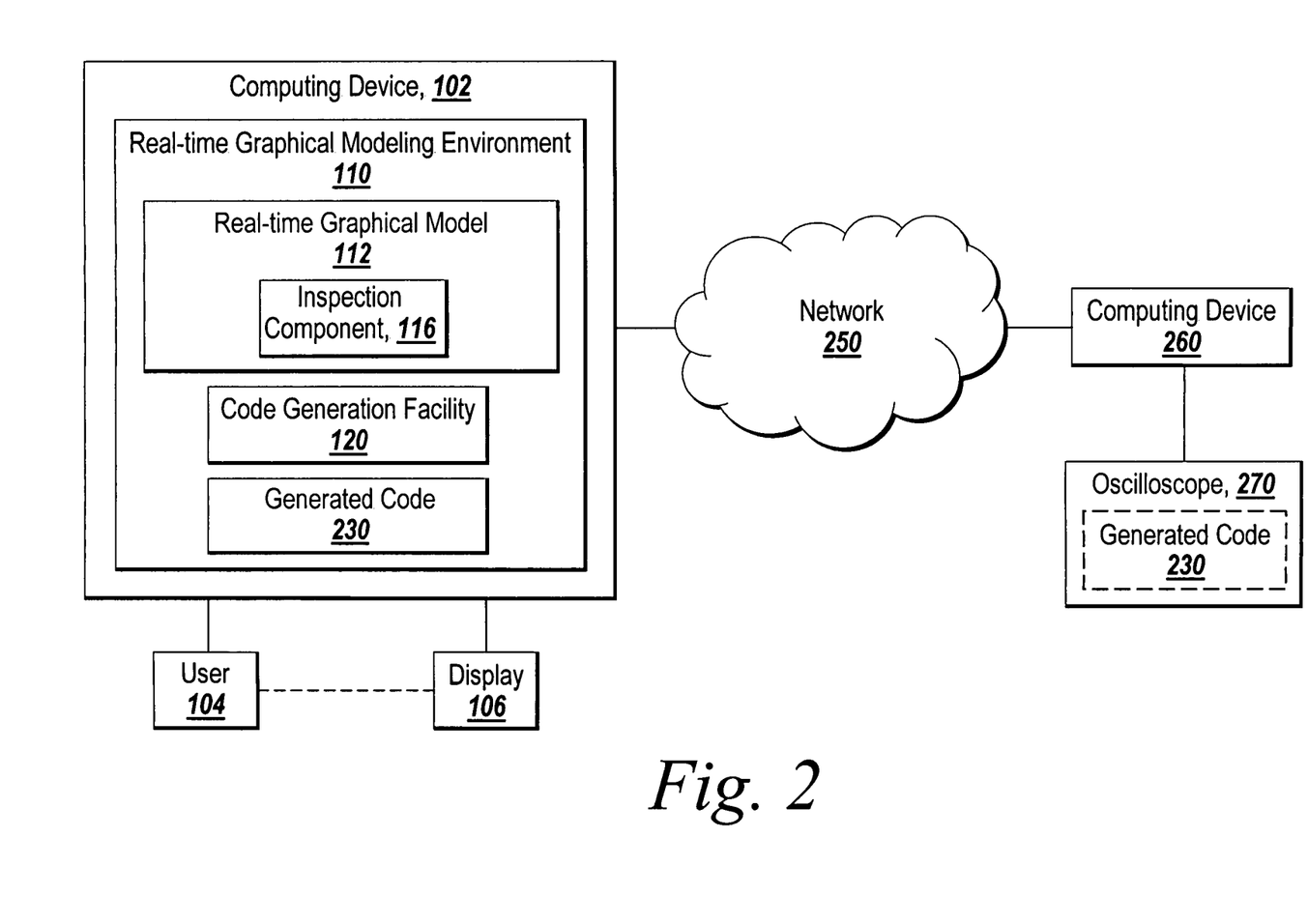
FIG. 2 depicts an alternate distributed environment suitable for practicing an embodiment of the present invention.

It will be appreciated that an embodiment of the present invention may be practiced in a number of differently configured environments including the alternate distributed environment depicted in FIG. 2. A first computing device 102 may communicate over a network 250 with a second computing device 260. The network may be a Local Area Network (LAN), a Wide Area Network (WAN), an intranet, the Internet, a wireless network or some other type of network allowing the first computing device 102 to communicate with the second computing device 260. The first computing device 102 may support a real-time graphical modeling environment 110 which includes at least one real-time graphical model 112. The real-time graphical model 112 may include an inspection component 116 that represents data acquisition and/or logging logic. A user 104 viewing the real-time graphical model 112 on a display 106 may have configured parameters in the inspection component 116. A code generation facility 120 may generate C code or other executable code 230 intended for a target environment such as the oscilloscope 270 communicating with the second computing device 260. The generated code 230 may be transferred over the network 250 to the oscilloscope 270 where it is executed. Because the model from which the code is generated included the representation of the data acquisition and/or data logging logic in the inspection component 214, the embodiment of FIG. 2 is able to directly generate data acquisition and/or data logging code for the oscilloscope 260. Such direct generation of code that contained the data acquisition and/or data logging logic from the model was not possible using conventional techniques where the logic was hard-coded and opaque to the user.

Figure 3:
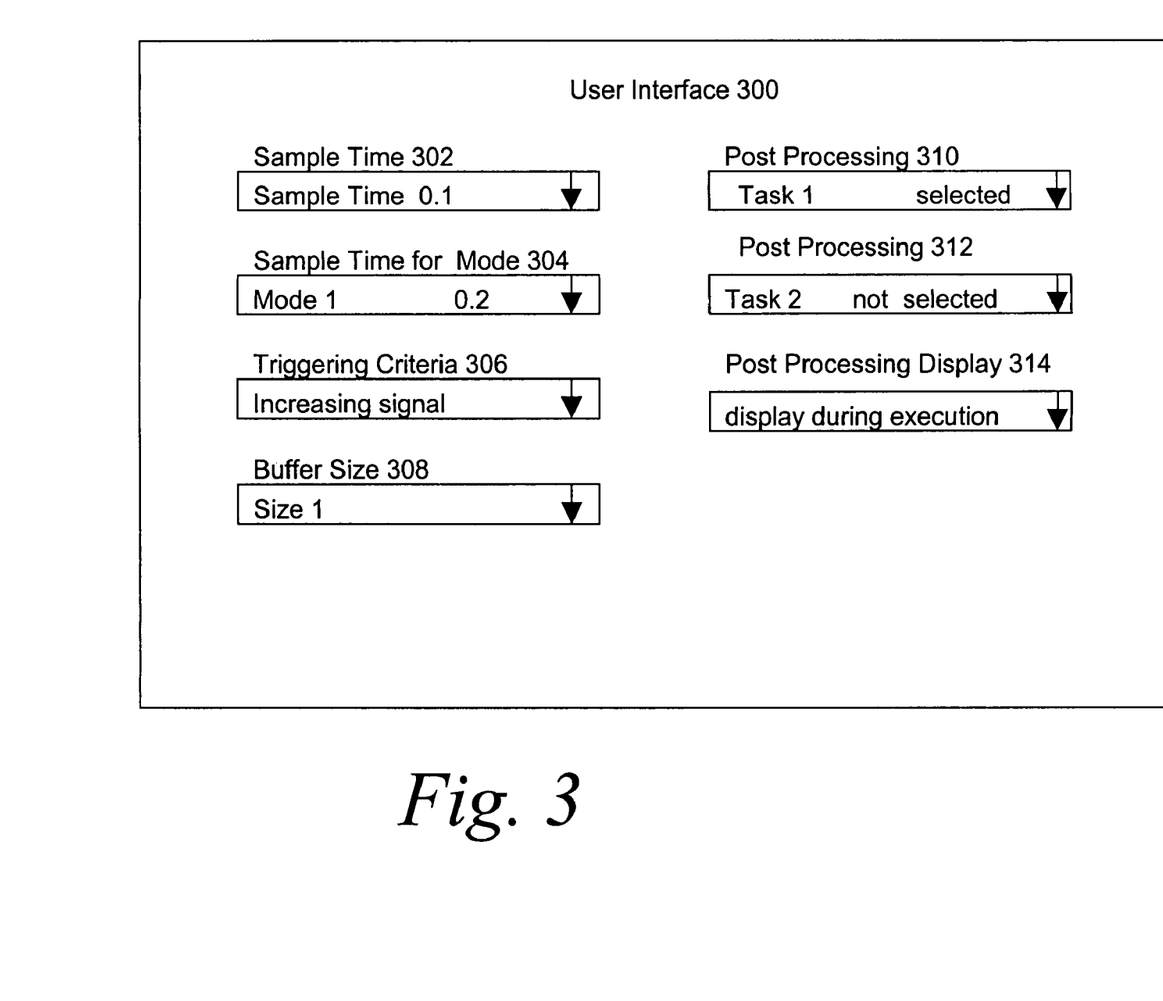
FIG. 3 depicts an exemplary dialog user interface for an inspection component.

FIG. 3 depicts an exemplary dialog user interface 300 for the inspection component 116. A sample time parameter 302 may be configured by the user. Similarly, a parameter which allows the user to select a sample time for a particular mode 304 may be provided. The user also may be provided an opportunity to select a triggering criteria parameter 306 which must be satisfied prior to the acquisition of data and/or the performing of logging operations. Exemplary triggering criteria include, but are not limited to, the receipt of an increasing signal, a decreasing signal, the receipt of multiple signals, the receipt of a signal with a certain value, that the model is in a particular state, and the occurrence of an external model event.

The user interface 300 may allow the selection of a particular buffer size parameter 308. Additionally, the user interface 300 for the inspection component may allow the user to specify parameters 310 and 312 for the performance of post-processing tasks such as horizontal and vertical data scaling, horizontal and vertical offset, formatting, noise elimination, filtering, display brightness, a parameter specifying a color of a displayed trace, spectral analysis and determining moving averages. The user interface 300 for the inspection component may also allow a user to configure a parameter 314 indicating whether the results of the post-processing should be displayed during execution of the model. The parameters selected by the user for the inspection component 116 are utilized during the generation of code with the result that the generated code includes the data acquisition and data logging logic. For example, if C code is generated based on the model for a target platform, and if the configured parameters of the inspection component specify a rising signal as a trigger criteria for data acquisition and logging operations to take place, then the generated C code executed on the target platform also requires the satisfaction of the trigger criteria before the data acquisition and/or logging operations occur.

Figure 4:
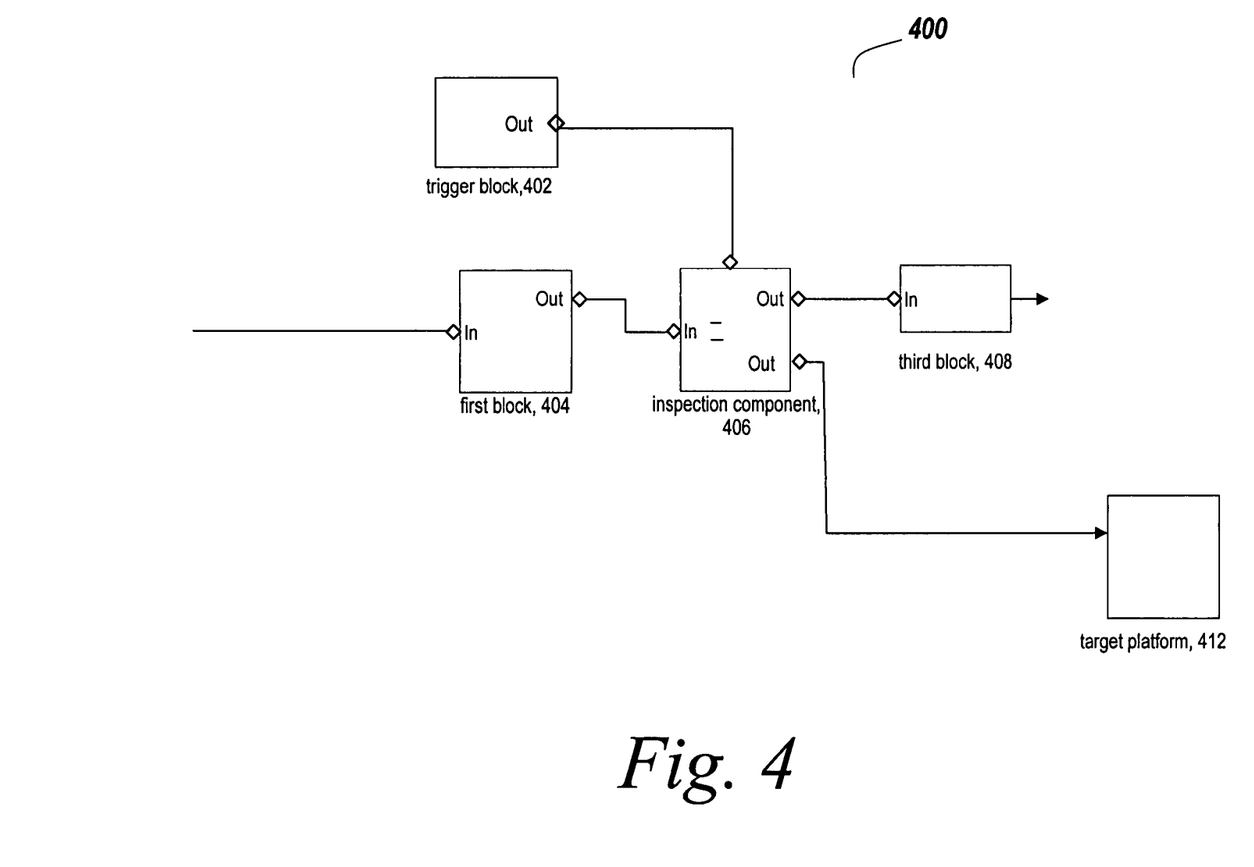
FIG. 4 depicts an exemplary model with an inspection component.

FIG. 4 depicts an exemplary model 400 that includes an inspection component. The model 400 includes a trigger block 402 generating a signal that is received by the inspection component 406. For example, the trigger block 402 may be a signal generation block or a subsystem that produces a signal. It will be appreciated that the inspection component 406 may be a block or another representation suitable for a modeling environment. The model also includes a first block 404 sending data to the inspection component 406. The inspection component includes user-configurable parameters that control the data acquisition and/or logging logic for the model 400. The configured parameters within the inspection component 406 are utilized in the generation of code for a target platform 412. The model also may include a third block 408 such as an oscilloscope block that has access to data from the first block 404, via the inspection component 406, only after the satisfaction of triggering criteria specified in the inspection component.

The oscilloscopes being modeled typically only have input data (e.g., sinks). The intermediate inspection components however may have output data (e.g., sources). For instance, there may be a pre-processing step that filters data and produces "filtered" data. This is then consumed by the buffer for the oscilloscope and ultimately by the display. The oscilloscopes may only acquire data following the satisfaction of triggering conditions based on external criteria (receipt of a signal, a signal value, etc.). The inspection component 116 also allows the user to specify that the oscilloscope being modeled perform post-processing of acquired data. For example, the oscilloscope may perform data scaling, formatting, noise elimination, filtering, spectral analysis and determine moving averages. In an embodiment of the invention, the oscilloscope runs in its own task separate from the real-time task and optionally at the end of the real-time task.

Figure 5:
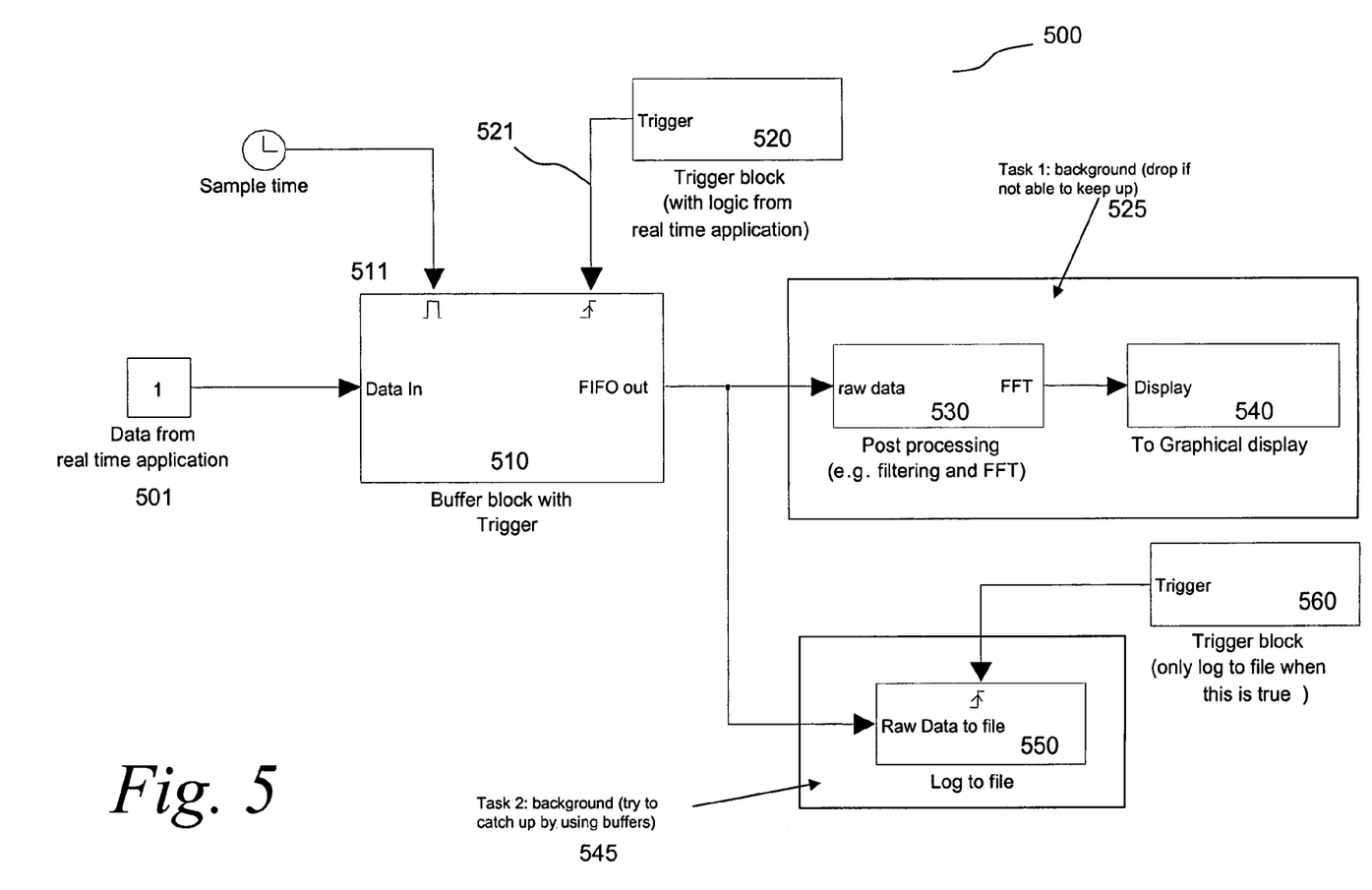
FIG. 5 depicts an exemplary post-processing block.

FIG. 5 depicts an exemplary oscilloscope type instrument 500 modeled with the aid of an embodiment of the present invention. As noted above, the inspection component may be a single block providing configurable parameters for data acquisition and logging logic or it may be a collection of blocks/components. For example, in the oscilloscope 500 being modeled in FIG. 5, the inspection component may include a buffer block 510, trigger blocks 520 and 560, post-processing block 530 and display block 540, and logging block 550, all of which may be configurable by a user to provide modeling flexibility. The data acquisition occurs in the buffer block 510. The acquisition of a buffer of data is initiated by the trigger signal 521, and the sample time 511 is given by the sample time input (this also allows a variable sample time depending upon what is occurring in the model). The trigger/sample time combination may be a conjunction ('acquire data when the trigger occurs and the clock pulse is high'), a disjunction ('acquire data at a rate of the clock pulse and also acquire data when the trigger occurs, independent of one another'), or other combination (e.g., 'start acquiring data with the rate of the clock pulse once the trigger happens and potentially stop when the trigger happens again').

The output of the buffer block 510 then is made available to a post processing block 530 where post-processing occurs. For example, in the exemplary post-processing block 530 in FIG. 5, a Fast Fourier Transform (FFT) of the data is taken. The output of the post-processing block is made available to a display block 540, which may use the Real time OS to control the display of the data. The post-processing runs in a separate background task 525, which may drop/disregard a buffer's worth of FFT if it cannot finish in time. The output of the buffer block 510 (raw data) also is made available to a logging block 550 which logs the data to a file. To conserve space, the logging to file may be turned on and off using a trigger block 560. Thus, the data may be logged to the file only during a "critical event" or for a duration related to a critical event (for example, immediately following the critical event). The logging to file also may run in another task 545, which allows the execution to "catch up" if it cannot execute in real-time. For this reason, the logging block may have its own buffer which may be of a smaller size.

It should be appreciated that pre-processing of the data may also take place between the "data from real-time application" block 501 and the buffer block 510. Other embodiments are also possible, such as combining periodic mode (with a sample time which is possibly variable) with event-based mode to log data only every time an event occurs. It is also possible for blocks such as the buffer block 510 to generate a trigger, which, for instance, might be an input to another block such as a buffer block or a logging block.

The block or set of blocks making up the inspection component thus enables the user to build an acquisition/logging device and not be constrained by what the provider of the real-time environment has provided. The implementations may vary based on the needs of the user and the particular needs of their application. A significant part of the "software oscilloscope" code may then be generated from this graphical description. After being configured, the inspection component may be kept with the rest of the graphical model of the real-time application. Alternatively, the code for the inspection component may be generated separately to create a single block, which can then be included in other graphical real time applications. The code may be generated in C, C++, VHDL or other programming language. A model file may be generated that can be read by an interpreter that executes on a platform. Or, in general, a software stack may be available on the platform that runs the real-time model and/or its non real-time parts that virtualizes the underlying hardware. This software stack may include application software.

In an exemplary embodiment, a user can set how 'real-time' a task is. This may be based on qualitative assessments such as 'not essential', 'provide occasionally', etc. In one example, the distinction for task scheduling may be divided as:

Hard real-time (a conventional real-time application)

Execute at least every N samples (in real-time but allowed to miss many samples, including an infinite number of samples with the result that there is a possibility that it never executes)

Buffer inputs and queue execution: For logging type tasks in which a user would like to be able to keep up on average. In this use case, the non real-time task will be able to possibly consume more than one sample at the same time. Thus, if 50 samples have queued up, it is possible that the task will only take 5 runs to clear the backlog.

Queue execution: A sample based queue in which the user wishes to process one sample at a time, but would like to catch up in the event of a backlog. This means that the task will have to run more than once per sample time when resources are available in order to catch up.

It should be appreciated that the real-time model may only have components that run in the modes listed above. A real-time model is a model that has at least a part that runs in real time, but, it may as well only contain a part that runs in non real-time but is executed according to a user's task scheduling selection.

Figure 6A:
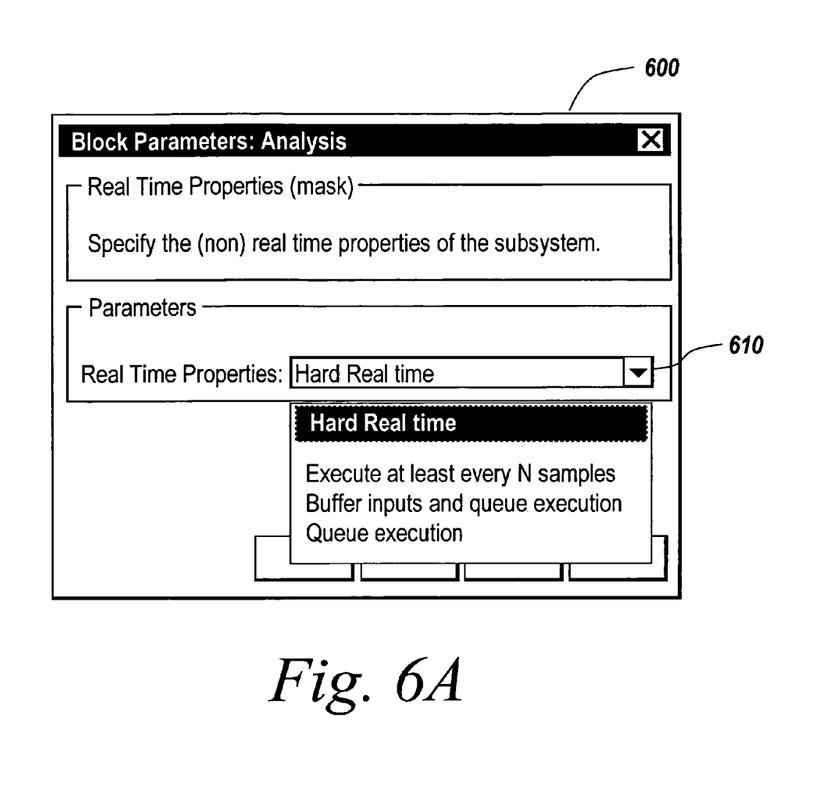
FIG. 6A depicts a dialog in which a user has selected a parameter indicating the task will execute in real-time.
Figure 6B:
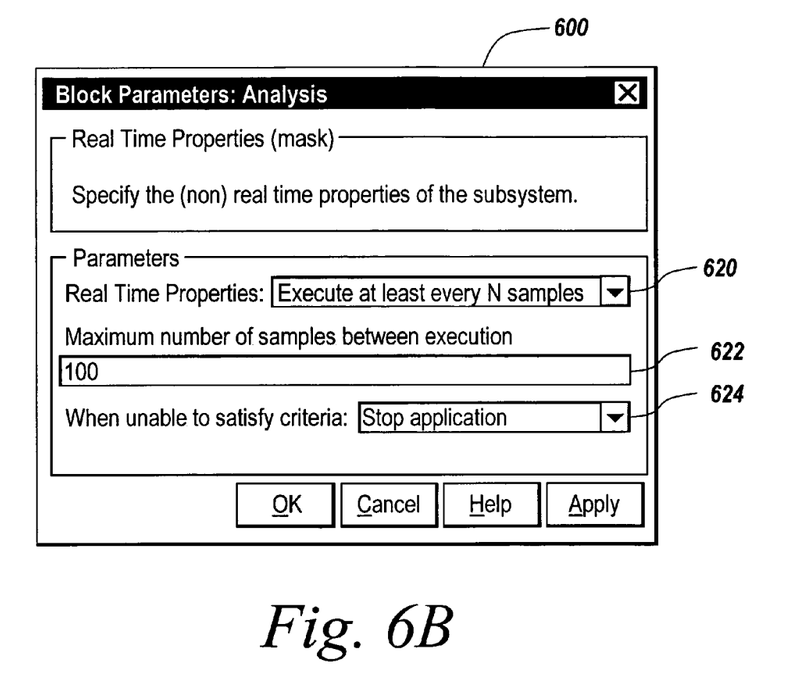
FIG. 6B depicts the dialog in which the user has selected a parameter indicating the task will execute in real-time.
Figure 6C:
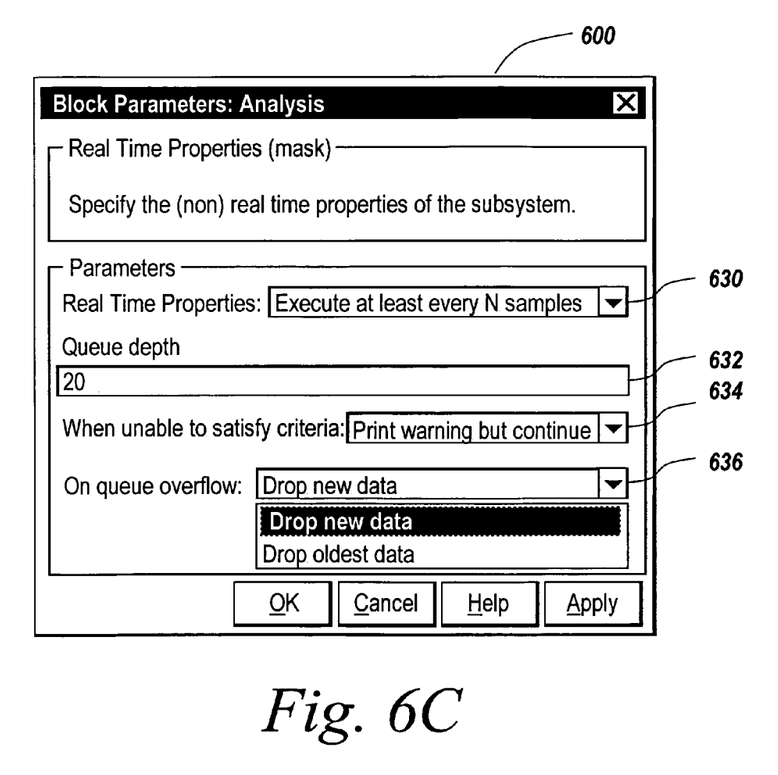
FIG. 6C depicts the dialog in which the user has specified buffer and queue parameters.

Exemplary dialogs used to set scheduling parameters are depicted in FIGS. 6A-6C. FIG. 6A depicts a dialog 600 in which a user has selected a "hard real-time" parameter 610 indicating the task will execute in real-time. FIG. 6B depicts the dialog 600 in which the user has selected an "Execute at least every. N samples" parameter 620. The initial selection may cause more parameter information to be solicited from a user such as the "maximum number of samples between execution" 622 and what should be done "when unable to satisfy criteria" 624 (in the illustrated selection the user has chosen to "stop application"). Similarly, FIG. 6C depicts the dialog 600 in which the user has specified "buffer inputs and queue execution" 630, "queue depth" 632, what should be done "when unable to satisfy criteria" 634 (in the illustrated selection the user has chosen to. "print warning but continue") and what should be done "on queue overflow" (in the illustrated selection the user has chosen to "drop new data" rather than "drop oldest data" from the queue).

Figure 7:
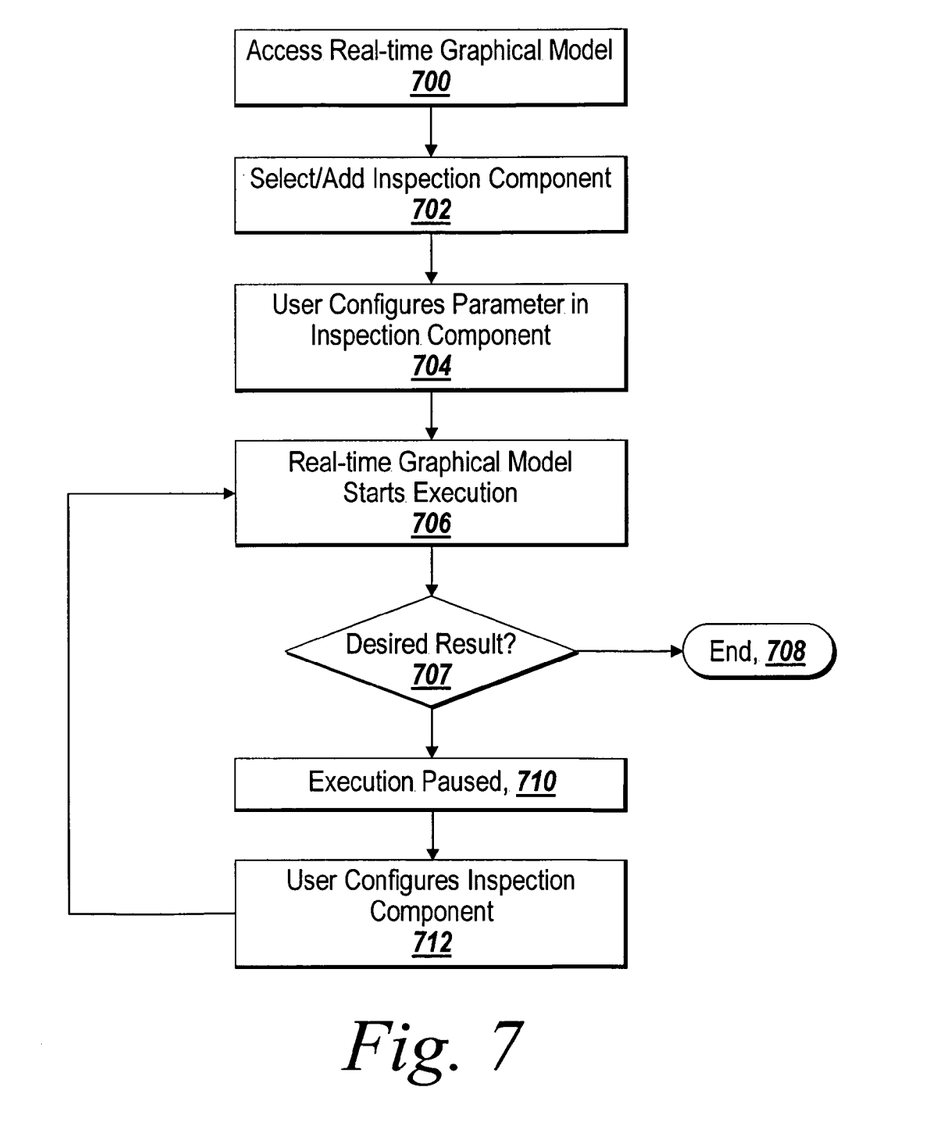
FIG. 7 is a flowchart of exemplary processing that may be performed by an embodiment of the present invention to generate code containing data acquisition logic based on a graphical model containing an inspection component.

FIG. 7 depicts exemplary processing that utilizes an inspection component in the acquisition of data. The sequence begins with the accessing of a real-time graphical model (step 700). The user then adds or selects an inspection component to the model (step 702). The inspection component exposes the data acquisition and/or data logging logic to the user. The user may configure at least one parameter in the inspection component (step 704) and the real-time graphical model begins execution (step 706). If the execution of the model produces a desired result (step 707), the sequence ends (step 708). Alternatively, if the desired result is not being produced (step 707), execution may be paused (step 710), the user configures the inspection component (step 712), and execution of the model begins again (step 706). An embodiment of the present invention thus allows the data acquisition logic to be customized during execution.

Figure 8:
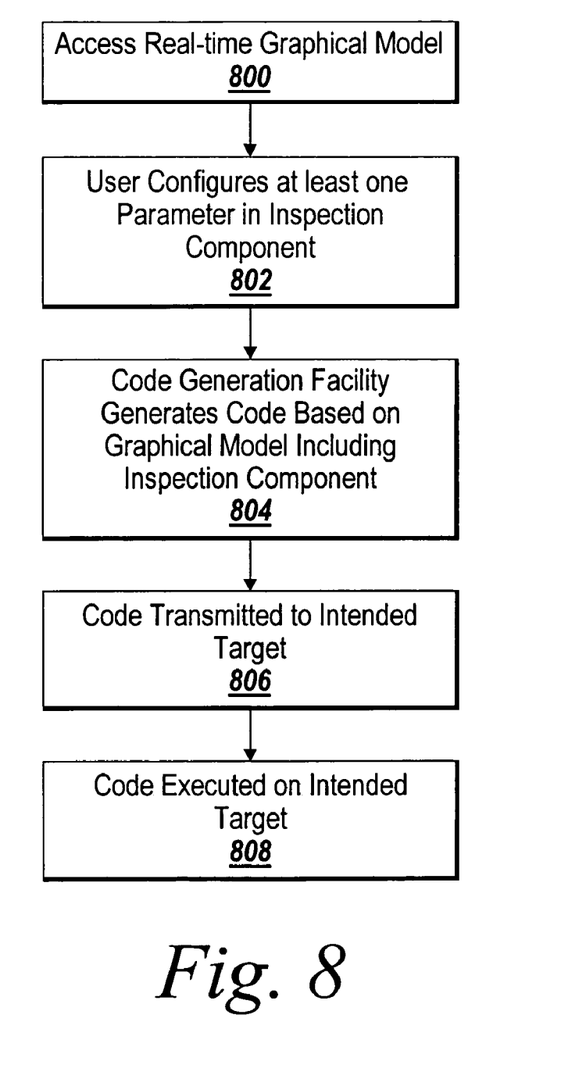
FIG. 8 is a flowchart of exemplary processing that may be performed by an embodiment of the present invention to utilize an inspection component in the acquisition of data.

An embodiment of the invention allows the generation of code for real-time target such as an oscilloscope. FIG. 8 depicts exemplary processing that generates code containing data acquisition logic based on a graphical model containing an inspection component. The sequence begins with the accessing of a real-time graphical model (step 800). The user may configure at least one parameter in an inspection component in the real-time model (step 802). The code generation facility may then generate code based on the graphical model (and the inspection component) (step 804). The code is transmitted to an intended target such as an oscilloscope (step 806) and executed in a real-time environment (step 808). The inclusion of the data acquisition logic in the real-time graphical model results in executable code for the intended target that includes the data acquisition logic.

The present invention may be provided as one or more computer-readable programs embodied on or in one or more mediums. The mediums may be a floppy disk, a hard disk, a compact disc, a digital versatile disc, a flash memory card, a Programmable Read-Only Memory (PROM), an Magnetoresistive Random Access Memory (MRAM), a Random Access Memory (RAM), a Read-Only Memory (ROM), or a magnetic tape. In general, the computer-readable programs may be implemented in any programming language. Some examples of languages that can be used include MATLAB, FORTRAN, C, C++, C#, Python or Java. The software programs may be stored on or in one or more mediums as object code. Hardware acceleration may be used and all or a portion of the code may run on an FPGA, an ASIC or an Application Specific Instruction Set Processor (ASIP) or with the use of a graphics processing unit (GPU). The code may run in a virtualized environment such as in a virtual machine. Multiple virtual machines running the code may be resident on a single processor.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. A physical medium holding computer-executable instructions for controlling at least one of data acquisition and logging in a real-time modeling environment, the data acquisition carried out according to data acquisition logic, the medium comprising:
   instructions for accessing a real-time graphical model that includes a plurality of components, the plurality of components including at least one inspection component for exposing at least a part of the data acquisition logic such that the data acquisition logic is provided as a part of the real-time graphical model, the data acquisition logic including parameters configurable by a user, the parameters controlling data acquisition during an execution of the real-time graphical model;
   instructions for configuring at least one of the parameters of the data acquisition logic in the inspection component; and
   instructions for generating code for the real-time graphical model that includes the at least one inspection component, the instructions comprising instructions for generating the data acquisition logic in the code based on the at least one configured parameter.

2. The medium of claim 1, further comprising:
   instructions for logging data in response to the configuration of the at least one parameter based on an external event.

3. The medium of claim 1, further comprising:
   instructions for acquiring data during the execution of the real-time model;
   instructions for processing the acquired data; and
   instructions for saving the processed acquired data.

4. The medium of claim 1 wherein the real-time graphical model models an execution of at least one of an oscilloscope, multimeter, spectrum analyzer, strip chart or gauge.

5. The medium of claim 1 wherein the at least one configured parameter is a trigger criteria that is satisfied prior to the acquisition of data.

6. The medium of claim 5 wherein the trigger criteria is satisfied by receiving an enabling signal.

7. The medium of claim 6 wherein the received enabling signal is an increasing signal or a decreasing signal.

8. The medium of claim 6, further comprising:
   instructions for indicating the model is in a user-specified state before receipt of the enabling signal.

9. The medium of claim 1 wherein the at least one configured parameter is a trigger criteria that is satisfied prior to the acquisition of data by an event occurring during the execution of the model.

10. The medium of claim 1 wherein the at least one configured parameter is at least one of an acquisition sample time parameter, buffer size parameter, delay parameter, parameter specifying an amount of jitter allowed, a horizontal scaling parameter, a vertical scaling parameter a vertical offset parameter, a horizontal offset parameter, a display brightness parameter, or a parameter specifying a color of a displayed trace.

11. The medium of claim 1 wherein the at least one inspection component is one of a buffer block, a post processing task block, a subsystem block for an oscilloscope, or a signal selector block.

12. The medium of claim 1, further comprising:
instructions for pausing the execution of the model;
instructions for configuring an additional parameter in the inspection component while the execution is paused; and
instructions for resuming execution of the model subject to the additional parameter.

13. The medium of claim 12 wherein the configuration of the additional parameter configures at least one parameter selected from the group of a buffer size and type of input signal used as a triggering criteria for the data acquisition.

14. The medium of claim 1 wherein the instructions for the configuring further comprise:
instructions for receiving a user-selection of a parameter relating to one of a plurality of data acquisition modes.

15. The medium of claim 14 wherein the data acquisition mode selected by the user specifies one of executing in real-time, executing at least every N samples or queuing execution in a sample-based queue in which one sample at a time is processed unless a backlog develops in which case execution occurs more than once per sample time when resources become available.

16. A physical medium holding computer-executable instructions for controlling at least one of data acquisition and logging in a real-time modeling environment, the data acquisition carried out according to data acquisition logic, the medium comprising:
instructions for accessing a graphical model that includes a plurality of components, the plurality of components including at least one inspection component for exposing at least a part of the data acquisition logic such that the data acquisition logic is provided as a part of the graphical model, the data acquisition logic including parameters configurable by a user, the parameters controlling at least one of data acquisition and logging operations during an execution of the graphical model;
instructions for configuring at least one of the parameters in the inspection component; and
instructions for generating code from the graphical model and the at least one inspection component for an intended target, the instructions comprising instructions for generating the data acquisition logic in the code based on the at least one configured parameter.

17. The medium of claim 16, further comprising:
instructions for executing the generated code in a real-time operating environment, the execution of the code causing an acquisition of data based on the at least one configured parameter.

18. The medium of claim 16, further comprising:
instructions for acquiring data during the execution of the model;
instructions for processing the acquired data; and
instructions for saving the processed data.

19. The medium of claim 16 wherein the intended target is at least one of an oscilloscope, multimeter, spectrum analyzer or gauge.

20. The medium of claim 16 wherein the at least one configured parameter is a trigger criteria that is satisfied prior to at least one of the acquisition or logging of data.

21. The medium of claim 20 wherein the trigger criteria includes an attaining of a user-specified state.

22. The medium of claim 20 wherein the at least one configured parameter is a trigger criteria that is satisfied prior to the acquisition or logging of data by an event occurring during the execution of the model.

23. The medium of claim 16 wherein the at least one configured parameter is at least one of an acquisition sample time parameter, buffer size parameter, delay parameter, parameter specifying an amount of jitter allowed, a horizontal scaling parameter, a vertical scaling parameter a vertical offset parameter, a horizontal offset parameter, a display brightness parameter, or a parameter specifying a color of a displayed trace.

24. The medium of claim 16 wherein the at least one inspection component is one of a buffer block, a post processing task block, a subsystem block for an oscilloscope, or a signal selector block.

25. The medium of claim 16 wherein the parameters include parameters indicating at least one of data acquisition and logging operations should occur periodically subject to resource availability.

26. The medium of claim 16 wherein the instructions for the configuring further comprise:
instructions for receiving a user-selection of a parameter relating to one of a plurality of data acquisition or logging modes.

27. The medium of claim 26 wherein the data acquisition or logging mode selected by the user specifies one of executing in real-time, executing at least every N samples, queuing execution and buffering inputs for logging tasks, or queuing execution in a sample-based queue in which one sample at a time is processed unless a backlog develops in which case execution occurs more than once per sample time when resources become available.

28. A system for controlling data acquisition in a real-time modeling environment, the data acquisition carried out according to data acquisition logic, the system comprising:
a real-time graphical model that includes a plurality of components, the plurality of components including at least one inspection component for exposing at least a part of the data acquisition logic such that the data acquisition logic is provided as a part of the real-time graphical model, the data acquisition logic including parameters configured by a user, the parameters controlling data acquisition during an execution of the real-time graphical model;
a code generation facility generating code for a target from the real-time graphical model that includes the at least one inspection component, the code generating facility generating the data acquisition logic in the code based on the configured parameters; and
a display device displaying the real-time graphical model to a user.

29. The system of claim 28, further comprising:
code generated by the code generation facility, the code executable on the target.

30. The system of claim 28 wherein the at least one configured parameter is at least one of an acquisition sample time parameter, buffer size parameter, delay parameter, parameter specifying an amount of jitter allowed, a horizontal scaling parameter, a vertical scaling parameter a vertical offset parameter, a horizontal offset parameter, a display brightness parameter, or a parameter specifying a color of a displayed trace.

31. A method for controlling at least one of data acquisition and logging in a real-time modeling environment, the data acquisition carried out according to data acquisition logic, the method comprising:
accessing a real-time graphical model that includes a plurality of components, the plurality of components including at least one inspection component for exposing at least a part of the data acquisition logic such that the data acquisition logic is provided as a part of the real-time graphical model, the data acquisition logic including parameters configurable by a user, the parameters controlling data acquisition during an execution of the real-time graphical model;

configuring at least one of the parameters in the inspection component; and generating code for the real-time graphical model that includes the at least one inspection component, generating the code comprising generating the data acquisition logic in the code based on the at least one configured parameter.

32. The method of claim 31, further comprising:
logging data in response to the configuration of the at least one parameter based on an external event.

33. The method of claim 31, further comprising:
acquiring data during the execution of the real-time model;
processing the acquired data; and
saving the processed acquired data.

34. The method of claim 31 wherein the real-time graphical model models an execution of at least one of an oscilloscope, multimeter, spectrum analyzer or gauge.

35. The method of claim 31 wherein the at least one configured parameter is a trigger criteria that is satisfied prior to the acquisition of data.

36. The method of claim 35 wherein the trigger criteria is satisfied by a determination that the model is in a user-specified state.

37. The method of claim 31 wherein the at least one configured parameter is a trigger criteria that is satisfied prior to the acquisition of data by an event occurring during the execution of the model.

38. The method of claim 31 wherein the at least one configured parameter is at least one of an acquisition sample time parameter, buffer size parameter, delay parameter, parameter specifying an amount of jitter allowed, a horizontal scaling parameter, a vertical scaling parameter a vertical offset parameter, a horizontal offset parameter, a display brightness parameter, or a parameter specifying a color of a displayed trace.

39. The method of claim 31 wherein the at least one inspection component is one of a buffer block, a post processing task block, a subsystem block for an oscilloscope, or a signal selector block.

40. The method of claim 31, further comprising:
pausing the execution of the model;
configuring an additional parameter in the inspection component while the execution is paused; and
resuming execution of the model subject to the additional parameter.

41. The method of claim 31 wherein the configuring further comprises:
receiving a user-selection of a parameter relating to one of a plurality of data acquisition modes.

42. The method of claim 41 wherein the data acquisition mode selected by the user specifies one of executing in real-time, executing at least every N samples or queuing execution in a sample-based queue in which one sample at a time is processed unless a backlog develops in which case execution occurs more than once per sample time when resources become available.

43. A method for controlling at least one of data acquisition and logging in a real-time modeling environment, the data acquisition carried out according to data acquisition logic, the method comprising:

accessing a graphical model that includes a plurality of components, the plurality of components including at least one inspection component for exposing at least a part of the data acquisition logic such that the data acquisition logic is provided as a part of the graphical model, the data acquisition logic including parameters configurable by a user, the parameters controlling at least one of data acquisition and logging operations during an execution of the graphical model;

configuring at least one of the parameters in the inspection component; and generating code from the graphical model and the at least one inspection component for an intended target, generating the code comprising generating the data acquisition logic in the code based on the at least one configured parameter.

44. The method of claim 43, further comprising:
executing the generated code in a real-time operating environment, the execution of the code causing an acquisition of data based on the at least one configured parameter.

45. The method of claim 43, further comprising:
acquiring data during the execution of the model;
processing the acquired data; and
saving the processed data.

46. The method of claim 43 wherein the intended target is at least one of an oscilloscope, multimeter, spectrum analyzer, or gauge.

47. The method of claim 43 wherein the at least one configured parameter is a trigger criteria that is satisfied prior to at least one of the acquisition or logging of data.

48. The method of claim 43 wherein the trigger criteria includes an attaining of a user-specified state.

49. The method of claim 43 wherein the at least one configured parameter is a trigger criteria that is satisfied prior to the acquisition of data by an event occurring during the execution of the model.

50. The method of claim 43 wherein the at least one configured parameter is at least one of an acquisition sample time parameter, buffer size parameter, delay parameter, parameter specifying an amount of jitter allowed, a horizontal scaling parameter, a vertical scaling parameter a vertical offset parameter, a horizontal offset parameter, a display brightness parameter, or a parameter specifying a color of a displayed trace.

51. The method of claim 43 wherein the parameters include parameters indicating at least one of data acquisition and logging operations should occur periodically subject to resource availability.

52. The method of claim 43 wherein the configuring further comprises:
receiving a user-selection of a parameter relating to one of a plurality of data acquisition or logging modes.

53. The method of claim 52 wherein the data acquisition or logging mode selected by the user specifies one of executing in real-time, executing at least every N samples, queuing execution and buffering inputs for logging tasks, or queuing execution in a sample-based queue in which one sample at a time is processed unless a backlog develops in which case execution occurs more than once per sample time when resources become available.

* * * * *

UNITED STATES PATENT AND TRADEMARK OFFICE
CERTIFICATE OF CORRECTION

| | | |
|---|---|---|
| PATENT NO. | : 7,983,879 B1 | Page 1 of 1 |
| APPLICATION NO. | : 11/893623 | |
| DATED | : July 19, 2011 | |
| INVENTOR(S) | : Michael A. Vetsch et al. | |

It is certified that error appears in the above-identified patent and that said Letters Patent is hereby corrected as shown below:

At column 12, line 64 (claim 10, line 5) of the printed patent, please insert --,-- after parameter.

At column 14, line 7 (claim 23, line 5) of the printed patent, please insert --,-- after parameter.

At column 14, line 58 (claim 30, line 5) of the printed patent, please insert --,-- after parameter.

At column 15, line 39 (claim 38, line 5) of the printed patent, please insert --,-- after parameter.

At column 16, line 44 (claim 50, line 5) of the printed patent, please insert --,-- after parameter.

Signed and Sealed this
Tenth Day of January, 2012

David J. Kappos
*Director of the United States Patent and Trademark Office*